UNITED STATES PATENT OFFICE.

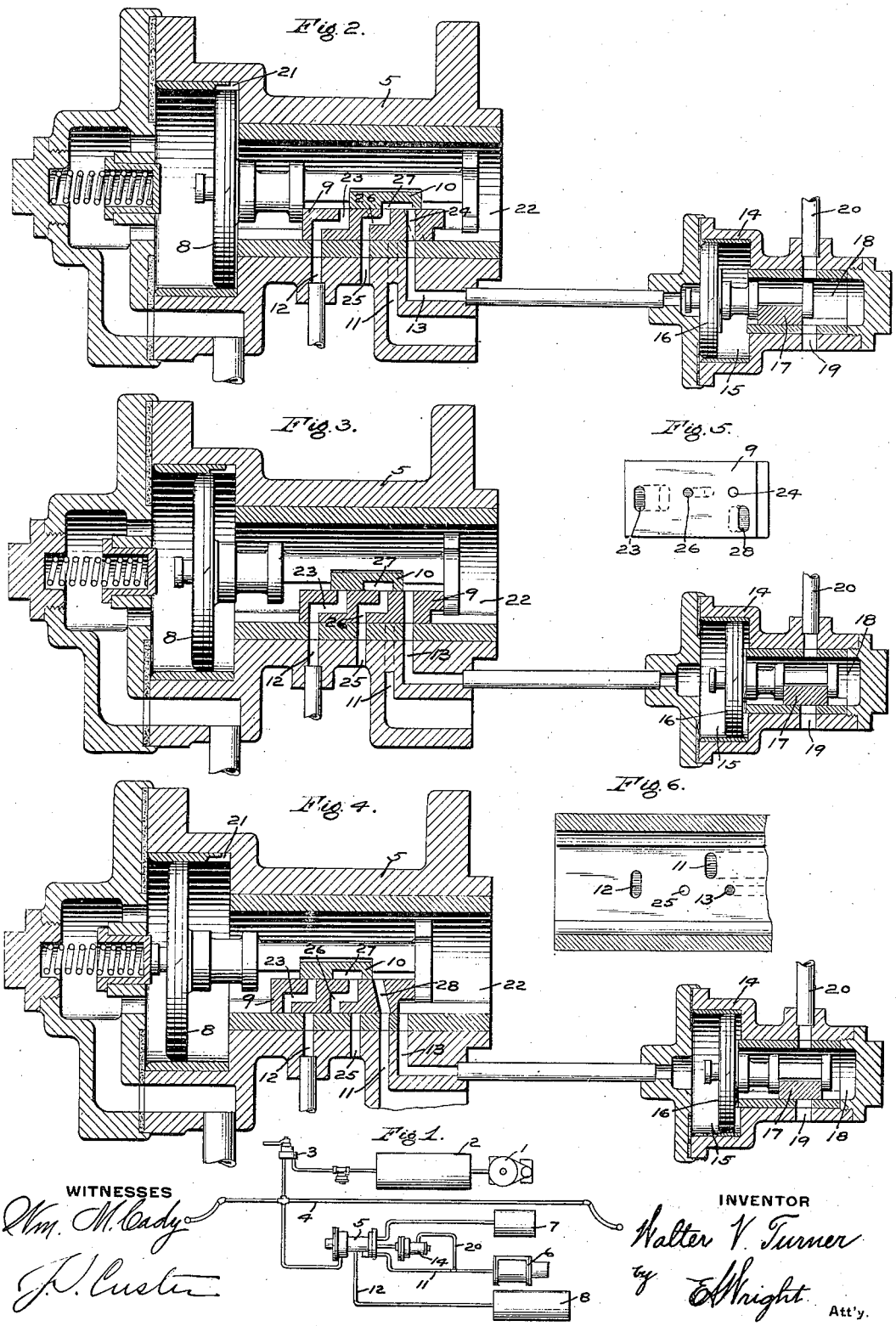

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,130,449.  Specification of Letters Patent.  Patented Mar. 2, 1915.

Application filed November 20, 1908. Serial No. 463,606.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and is in the nature of an improvement on certain features disclosed in applicant's copending application, Serial No. 364,215, filed March 25, 1907, more particularly with reference to the supplemental valve mechanism for controlling the release of air from the brake cylinder.

In the accompanying drawing, Figure 1 is a diagrammatic view illustrating a car air brake equipment with my improvements applied thereto; Fig. 2 a central sectional view of a triple valve device and a preferred form of the auxiliary release controlling valve mechanism connected thereto, showing the parts in full release position; Fig. 3 a similar view, showing the position assumed by the parts upon a partial release of fluid from the brake cylinder; Fig. 4 a similar view, showing the parts in service application position; Fig. 5 a face view of the main slide valve of the triple valve device, showing location of ports therein; and Fig. 6 a plan view of the main slide valve seat.

According to Fig. 1 of the drawings, my improvements are shown applied to a car air brake equipment of the motor car type, comprising an air compressor 1, main reservoir 2, engineer's brake valve 3, train pipe 4, triple valve device 5, brake cylinder 6, auxiliary reservoir 7, and supplemental reservoir 8, all connected up in the usual manner.

The triple valve device as shown in Fig. 2 comprises the usual piston 8 adapted to operate a main slide valve 9 and a graduating auxiliary valve 10 mounted on and having a movement relative to the main valve. The brake cylinder 6 and a supplemental reservoir 8 are connected by the respective ports 11 and 12 with the main slide valve seat and in addition a port 13 leads from said seat to the supplemental release valve mechanism 14 which latter consists of a casing having a piston chamber 15 containing a movable abutment 16, the space at the outer face of which is in communication with port 13. Abutment 16 is adapted to operate a release valve 17 contained in valve chamber 18 and controlling exhaust port 19. Valve chamber 18 is in constant open communication with the brake cylinder through a pipe 20, so that the valve chamber 18 and the inner face of abutment 16 are subject to whatever pressure exists in the brake cylinder.

When the brake pipe is charged up, air flows around the triple piston through the usual feed groove 21 and charges the auxiliary reservoir 7, open to the valve chamber 22 and also flows through a port 23 in the main slide valve, registering the port 12, and charges the supplemental reservoir 8.

In release position of the parts the brake cylinder port 11 is closed by the main slide valve 9, the exhaust of the brake cylinder being controlled by the supplemental valve mechanism 14. In release position of the triple valve the port 13 registers with a port 24 in the main slide valve and is connected to an exhaust port 25 through port 26 in the main valve and cavity 27 in the auxiliary valve 10. The outer face of abutment 16 being therefore open to atmospheric pressure, if there is any pressure in the brake cylinder the same will act on the inner face of the abutment and cause the movement of the release valve 17 so as to uncover the exhaust port 19 and permit the release of air from the brake cylinder.

If it is desired to make an application of the brakes, the brake pipe pressure is reduced in the usual manner causing the triple valve piston to assume the service application position, as shown in Fig. 4 of the drawing. In this movement of the parts, the service port 28 registers with brake cylinder port 11, so that fluid from the auxiliary reservoir is admitted to the brake cylinder in the usual manner. The movement of the main valve also uncovers port 13, so that fluid at auxiliary reservoir pressure flows to the outer face of abutment 16, thereby causing the release valve to move over and close the exhaust port 19 and prevent the escape of air from the brake cylinder. When the auxiliary reservoir pressure becomes reduced by flow of air to the brake cylinder to a degree less than the train pipe pressure, the triple piston 8 moves the auxiliary valve 10 to close the service port 11 in the usual manner, but as the main valve 9 does not move, the port 13 remains open and thereby the release valve 17 is maintained in its closed position. The brakes being applied, if it is desired to graduate off the pressure in the brake cylinder, a wave of increased pressure is sent through the brake pipe, thereby shifting the triple pistons to release position.

In release position, as before stated, the port 13 is connected with exhaust port 25 through port 24, cavity 27, and port 26 so that the fluid on the outer face of abutment 16 is vented to the atmosphere, and the brake cylinder pressure acting on the inner face of the abutment thereupon shifts the parts so that exhaust port 19 is uncovered, permitting air to exhaust from the brake cylinder. The movement of the triple valve to release position also establishes communication from the supplemental reservoir, through ports 12 and 23 to the valve chamber 22, so that a puff of air at the higher supplemental reservoir pressure is admitted thereto and acting on the inner face of the triple valve piston 8 shifts the auxiliary valve 10 so as to close the port 23 and uncover port 24 to the valve chamber 22, as shown in Fig. 3, air from the auxiliary reservoir is thus admitted through port 13 to the abutment 16 and the abutment and release valve are shifted to close the exhaust port 19 and cut off the further release of air from the brake cylinder.

As will be apparent, the brake cylinder pressure may be further reduced by again causing a wave of increased pressure to flow into the brake pipe so as to move the triple valve piston and auxiliary valve 10 to release position and thus effect the opening of the exhaust valve 17, and this operation may be repeated as desired.

Various other means may of course be employed for moving the automatic valve device from full release position upon a graduated increase in train pipe pressure so as to cause the successive opening and closing of the release valve mechanism, as will be apparent, though I prefer to employ a supplemental reservoir and means for venting fluid therefrom to the auxiliary reservoir in release position.

Having now described my invention, what I claim as new and desire to secure by Letters Patent, is:—

1. In a fluid pressure brake, the combination with a brake cylinder, train pipe, of a release valve mechanism constantly subject on one side to brake cylinder pressure and operated by fluid supplied to the opposite side in applying the brakes for closing the brake cylinder exhaust and an automatic valve device operated by a reduction in train pipe pressure for supplying fluid to the brake cylinder through a port independent of the release valve mechanism.

2. In a fluid pressure brake, the combination with a brake cylinder, a valve for controlling the exhaust of fluid from the brake cylinder, and a movable abutment constantly subject on one side to brake cylinder pressure for actuating said valve, of a train pipe and an automatic valve device having a piston subject to train pipe pressure and valve means operated by said piston and provided with a port for supplying fluid to the brake cylinder and a separate port for supplying fluid to the opposite side of said movable abutment to operate said abutment and valve for closing the brake cylinder exhaust.

3. In a fluid pressure brake, the combination with a valve for controlling the release of air from the brake cylinder and a movable abutment constantly subject on one side to brake cylinder pressure for actuating said valve, of an automatic valve device operated upon a reduction in train pipe pressure for supplying fluid from the auxiliary reservoir to the brake cylinder and through a separate passage to the opposite side of said abutment to close the communication for releasing air from the brake cylinder.

4. In a fluid pressure brake, the combination with a valve for controlling the release of air from the brake cylinder and a movable abutment constantly subject on one side to brake cylinder pressure for actuating said valve, of an automatic valve device operating upon an increase in train pipe pressure for connecting the opposite side of said abutment with the atmosphere to open the exhaust from the brake cylinder and operating upon a reduction in train pipe pressure to supply air from the auxiliary reservoir to the brake cylinder and through a separate passage to said abutment to close the communication for releasing air from the brake cylinder.

5. In a fluid pressure brake, the combination with a valve for controlling the release of air from the brake cylinder and a movable abutment constantly subject on one side to brake cylinder pressure for actuating said valve, of an automatic valve device subject to train pipe pressure and adapted upon a graduated increase in train pipe pressure to first move to release position and connect the opposite side of said abutment with the atmosphere and means for then moving said valve device to a position for supplying air from the auxiliary reservoir to said opposite side of the abutment.

6. In a fluid pressure brake, the combination with a valve for controlling the release of air from the brake cylinder and a movable abutment constantly subject on one side to brake cylinder pressure for actuating said valve, of an automatic valve device operating upon a reduction in train pipe pressure for supplying air to the brake cylinder and to the opposite side of said abutment and adapted in release position to connect said abutment to the atmosphere and means operating upon a graduated increase in train pipe pressure for moving the automatic valve device from release position to a position for also supplying air to said abutment.

In testimony whereof I have hereunto set my hand.

WALTER V. TURNER.

Witnesses:
WM. M. CADY,
A. M. CLEMENTS.